United States Patent
Branson et al.

(10) Patent No.: US 8,566,803 B2
(45) Date of Patent: Oct. 22, 2013

(54) BENCHMARK PROFILING FOR DISTRIBUTED SYSTEMS

(75) Inventors: Michael John Branson, Rochester, MN (US); Zachary Adam Garbow, Rochester, MN (US); David Roy Limpert, Rochester, MN (US); Candace Trielle Pederson, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1797 days.

(21) Appl. No.: 11/858,405

(22) Filed: Sep. 20, 2007

(65) Prior Publication Data
US 2009/0083717 A1    Mar. 26, 2009

(51) Int. Cl.
G06F 9/44 (2006.01)
G06F 17/18 (2006.01)
G06F 19/00 (2011.01)
G06F 11/30 (2006.01)
G21C 17/00 (2006.01)

(52) U.S. Cl.
USPC ........... 717/135; 717/126; 717/127; 717/131; 702/182

(58) Field of Classification Search
None
See application file for complete search history.

(56) References Cited

U.S. PATENT DOCUMENTS

| | | | |
|---|---|---|---|
| 2005/0120341 A1* | 6/2005 | Blumenthal et al. | 717/158 |
| 2005/0172278 A1* | 8/2005 | Kuch et al. | 717/158 |
| 2007/0261034 A1* | 11/2007 | Chen et al. | 717/130 |

* cited by examiner

Primary Examiner — Lewis A Bullock, Jr.
Assistant Examiner — Mark Gooray
(74) Attorney, Agent, or Firm — Patterson & Sheridan LLP

(57) ABSTRACT

Embodiments of the invention may be used to generate a benchmark profile for a computing job configured to execute on distributed systems. The benchmark profile may be used to predict the performance of components of a computing job for a variety of different distributed computing system architectures. A profiling tool evaluates the computing job to identify the particular performance characteristics of the application and match this with benchmarks that are most representative of the identified performance characteristics and store them in the benchmark profile. The identified benchmarks may then be run on different configurations of a distributed computing system in order to predict the performance of the application for a variety of scenarios.

21 Claims, 6 Drawing Sheets

BENCHMARK PROFILING FOR DISTRIBUTED SYSTEMS

BACKGROUND OF THE INVENTION

1. Field of the Invention

Embodiments of the invention relates to benchmark profiling, specifically to benchmark profiling software applications configured to execute on large parallel or distributed computing systems.

2. Description of the Related Art

Distributed computing systems, such as grid computing and computer clusters, are useful tools for breaking down large computing tasks, or jobs, into many smaller tasks that execute concurrently. Used in this manner, distributed systems are highly effective tools to perform large computing tasks in a minimal amount of time.

Distributed systems typically contain a large number of heterogeneous systems containing one or more compute nodes. Because the heterogeneous systems have different hardware architectures, each provides different advantages in executing different types of software. For example, systems with large memories provide good architectures for running database applications. Systems with a number of specialized processors are optimal for specialized processing, such as processing video images.

A benchmark provides a software tool that analyzes the performance of a given hardware architecture, relative to a particular specific performance trait. A benchmark allows users to compare the efficiency of different architectures for the same performance task, allowing a best architecture for the software task to be determined.

Two common types of benchmarks include application benchmarks and synthetic benchmarks. Application benchmarks dynamically record performance metrics while a software application is executing. On the other hand, synthetic benchmarks mimic the performance of a piece of software on a system to predict performance metrics without actually executing the application. Both of these types of benchmarks may be used to analyze how efficient a given computer architecture is regarding different performance traits while executing (either actually or synthetically).

SUMMARY OF THE INVENTION

One embodiment of the invention provides a method for generating a benchmark profile used to predict the performance of a software application. The method generally includes identifying a plurality of performance characteristics associated with the software application. Each performance characteristic specifies a processing activity performed by the software application. The method may also include determining a ratio for each identified performance characteristic, where each ratio specifies a proportion of the processing activity performed by the software application for one of the identified performance characteristics relative to the processing activity of the software application as a whole. For each of the plurality of performance characteristics, at least one benchmark is identified that is configured to evaluate the performance of a computer system relative to the performance characteristic. The method also includes generating the benchmark profile, where the benchmark profile stores the ratio for each identified performance characteristic and an indication of each identified benchmark.

Another embodiment of the invention includes a computer-readable storage medium containing a program configured to generate a benchmark profile used to predict the performance of a software application which, when executed on a processor, performs an operation. The operation generally includes identifying a plurality of performance characteristics associated with the software application. Each performance characteristic specifies a processing activity performed by the software application. The operation may also include determining a ratio for each identified performance characteristic, where each ratio specifies a proportion of the processing activity performed by the software application for one of the identified performance characteristics relative to the processing activity of the software application as a whole. For each of the plurality of performance characteristics, at least one benchmark is identified that is configured to evaluate the performance of a computer system relative to the performance characteristic. The operation may further include generating the benchmark profile, where the benchmark profile stores the ratio for each identified performance characteristic and an indication of each identified benchmark.

Still another embodiment of the invention includes a system having a processor and a memory containing a program configured to generate a benchmark profile used to predict the performance of a software application which, when executed on the processor, performs an operation. The operation generally includes identifying a plurality of performance characteristics associated with the software application. Each performance characteristic specifies a processing activity performed by the software application. The operation may also include determining a ratio for each identified performance characteristic, where each ratio specifies a proportion of the processing activity performed by the software application for one of the identified performance characteristics relative to the processing activity of the software application as a whole. For each of the plurality of performance characteristics, at least one benchmark is identified that is configured to evaluate the performance of a computer system relative to the performance characteristic. The operation may further include generating the benchmark profile, where the benchmark profile stores the ratio for each identified performance characteristic and an indication of each identified benchmark.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION OF THE PREFERRED EMBODIMENTS

Figure 1:
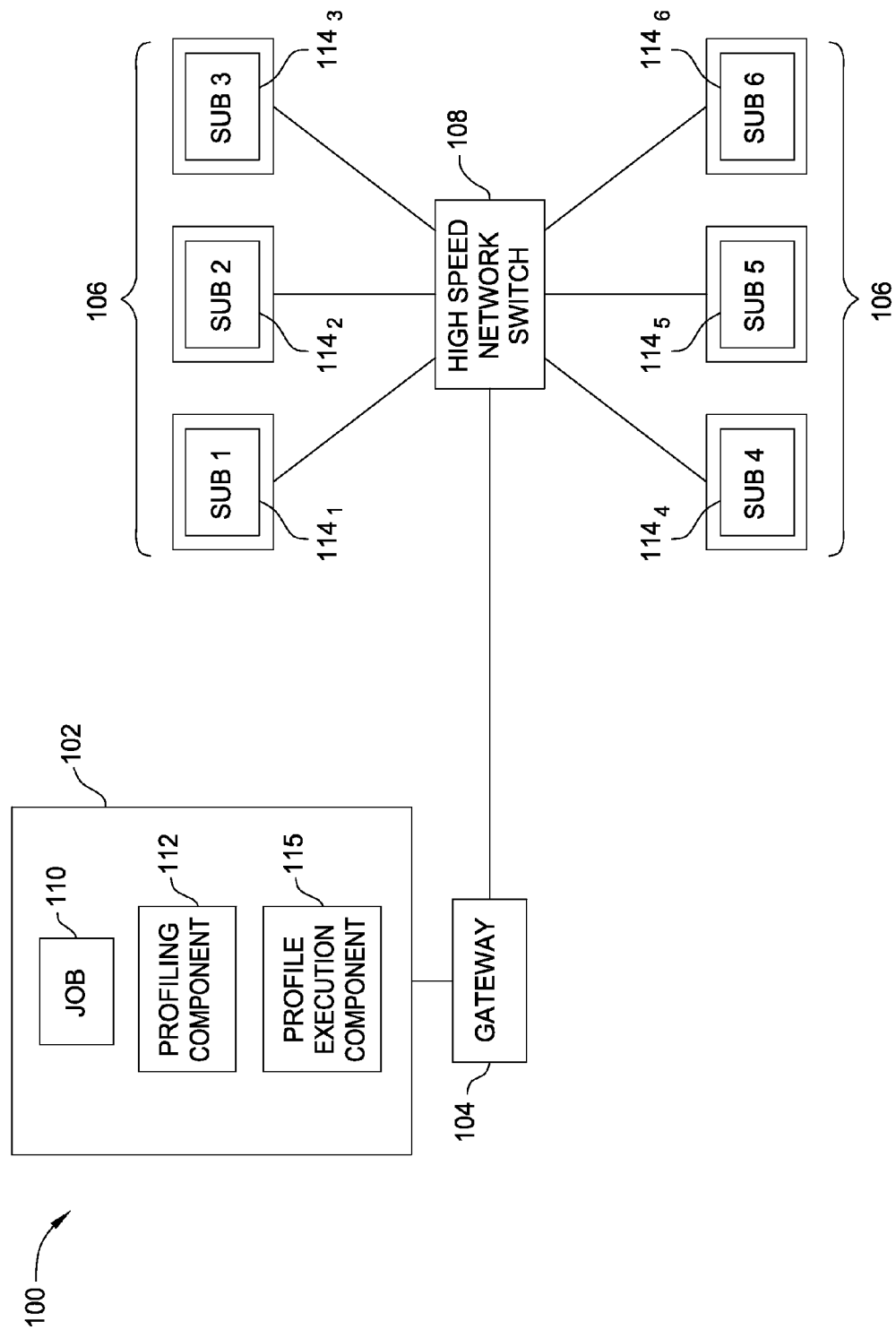
FIG. 1 illustrates a high level architecture of a computing cluster, according to one embodiment of the invention.

Application benchmarks may frequently be impractical to use in evaluating the performance of a software application on distributed system architectures. Application benchmarks require that a software application be running, which in some cases is impractical on a distributed system. Typically, software running on distributed systems requires extensive system setup before execution. Further, executing software on a distributed system may take hours, or even days, making application benchmarking time-consuming and expensive.

While synthetic benchmarks do not require that the software application be configured, loaded, and run on the distributed system, these benchmarks analyze performance in terms of how effectively a particular architecture performs a specific performance trait. For example, the well-known Whetstone benchmark measures the efficiency of a computer architecture with regard to processor use, specifically in terms of how many floating-point operations can be performed per second. Hence, for jobs on distributed systems, which typically require many interrelated performance traits to be evaluated to determine a preferred architecture for a given application, individual synthetic benchmarks may be ineffective.

Embodiments of the invention provide a method to generate a benchmark profile for a computing job configured to execute on distributed systems. The benchmark profile may be used to predict the performance of components of a computing job for a variety of different distributed computing system architectures. The computing job itself may include a plurality of subroutines, each with distinct performance traits, e.g. processor use, or memory consumption, floating point operations, resource accesses etc. For example, consider a case where a computing job includes two subroutines, one heavily dependent on processing power, and the other dependent on available memory. In such a case, a profiling tool could evaluate the computing job and identify these particular performance characteristics, also referred to as performance traits, of these two subroutines. Further, the profiling tool may identify benchmarks that are most representative of these identified performance characteristics and store them in benchmark profile. The identified benchmarks may be then run on different configurations of a distributed computing system to predict the performance of the application for a variety of scenarios.

In the following, reference is made to embodiments of the invention. However, it should be understood that the invention is not limited to specific described embodiments. Instead, any combination of the following features and elements, whether related to different embodiments or not, is contemplated to implement and practice the invention. Furthermore, in various embodiments the invention provides numerous advantages over the prior art. However, although embodiments of the invention may achieve advantages over other possible solutions and/or over the prior art, whether or not a particular advantage is achieved by a given embodiment is not limiting of the invention. Thus, the following aspects, features, embodiments and advantages are merely illustrative and are not considered elements or limitations of the appended claims except where explicitly recited in a claim(s). Likewise, reference to "the invention" shall not be construed as a generalization of any inventive subject matter disclosed herein and shall not be considered to be an element or limitation of the appended claims except where explicitly recited in a claim(s).

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

FIG. 1 illustrates the high level architecture of a computing cluster 100, according to one embodiment of the invention. Of course, embodiments of the invention may be adapted for use with a variety of other distributed computer systems, including grid computing, stream processing, and adaptive architecture supercomputing. Accordingly, the description of the architecture shown in FIG. 1 is not intended to limit the present invention.

Cluster 100 provides a conceptual illustration of a Beowulf cluster, as well as other clustering architectures. As shown, cluster 100 includes a user node 102, gateway node 104, and nodes 106 connected via high-speed network switch 108. Those skilled in the art will recognize that FIG. 1 provides a simplified representation of a computing cluster, and that the nodes of a typical computing cluster include a number of additional elements.

User node 102 may provide an interface to cluster 100. As such, user node 102 allows users to create, submit, and review the results of computing tasks submitted for execution on the nodes 106 of system 100. Head/gateway node 104 connects the user node 102 to the compute nodes 106. Compute nodes 106 provide the processing power of cluster 100. As is known, clusters are often built from racks of commonly available personal computer components. Thus, each node 106 may include one or more CPUs, memory, hard disk storage, a connection to high speed network switch 108, and other common personal computer components.

FIG. 1 also illustrates a job 110 running on user node 102 and subroutines 114$_{1-6}$ running on compute nodes 106. In one embodiment, job 110 may include a plurality of separate components, or subroutines, to be dispatched by user node 102 for execution on the compute nodes 106. Users may submit job 110 for execution through an interface provided on user node 102. In turn, user node 102 may execute job 110 by dispatching each subroutine 114 of the job 110 to the compute nodes 106. Each subroutine 114 may be executed on different nodes 106 within cluster 100.

In one embodiment, profiling component 112 may be configured to generate a benchmark profile, which provides a profile indicating which of one or more existing benchmarks, or portions of benchmarks, may accurately represent the runtime characteristics of job 110, and/or of subroutines 114$_{1-6}$. The profile execution component 115 may use the benchmark profile to invoke the appropriate benchmarks across one or more available nodes 106 to predict the likely performance of the job 110, given the current system state of cluster 100, without actually deploying the job 110. As described in greater detail below, profiling component 112 may be configured to determine a benchmark profile for job 110 by analyzing the source code of job 110 to determine the types of operations that are performed by subroutines 114$_{1-6}$, by measuring the characteristics of job 110 when it is executed on cluster 100 to generate a profile for future use, and/or via manual configuration by the user. In one embodiment, the benchmark profile may include a composition of individual benchmarks representative of the computing activity performed by job 110. Further, the benchmarks in the benchmark profile may be weighted so that the contribution of each benchmark reflects the amount of processing activity performed by job 110, relative to other benchmarks in the benchmark profile.

Further, profiling component 112 may be configured to determine a "best-fit" for a particular subroutine 114, based on the benchmark profile for generated for job 110 and the available nodes 106. As used herein, a "best-fit" generally refers to a process of matching one of subroutines 114 to the node 106 that may be able to more efficiently execute that subroutine 114 than other nodes 106.

Figure 2A:
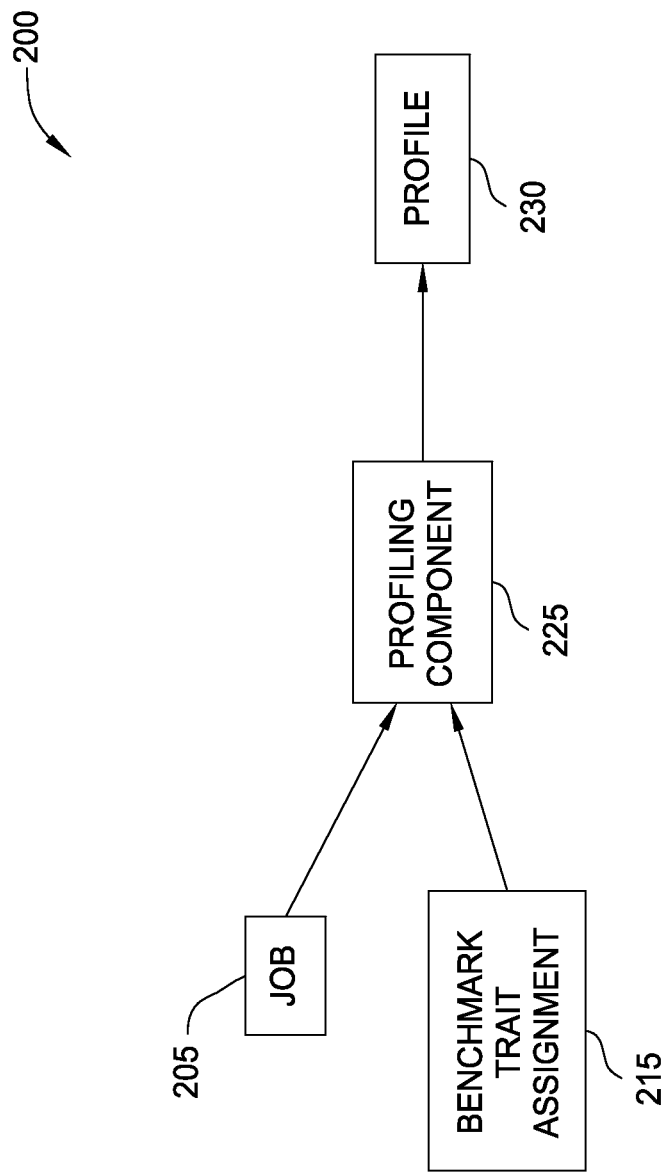
FIG. 2A illustrates a data flow diagram for a profiling component to generate a benchmark profile for a computing job, according to one embodiment of the invention.

FIG. 2A illustrates a data flow diagram 200 for a profiling component to generate a benchmark profile for a computing job, according to one embodiment of the invention. As shown, data flow diagram 200 includes a job 205, a benchmark trait assignment data structure 215, a profiling component, and a profile 230. Illustratively, the profiling component 225 receives input in the form of job 205 and benchmark trait assignment 215 and uses this input data to generate and output profile 230. In one embodiment, job 205 may be represented as a data structure that contains a textual representation of a computing job, e.g., the program source code of the computing job. Benchmark-trait assignment data structure 215 may include a collection of identifiers (IDs) for different benchmark applications. Each benchmark application may be used to evaluate the efficiency of a distributed computer system, relative to a particular performance characteristic. For example, for determining the efficiency of processor use, the Whetstone benchmark may be identified in benchmark-trait assignment 215. Similarly, other benchmarks may be associated with other performance characteristics.

Figure 2B:
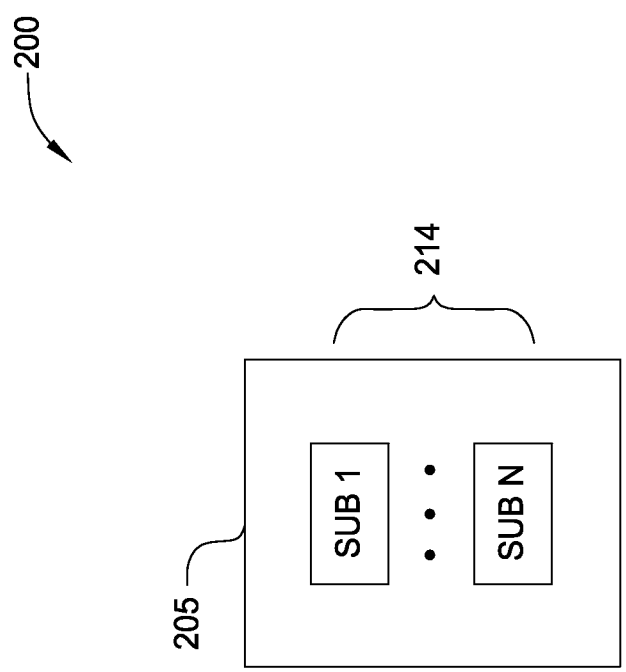
FIG. 2B illustrates an expanded view of a computing job, according to one embodiment of the invention.

FIG. 2B illustrates an expanded view of computing job 205 of FIG. 2A, according to one embodiment of the invention. In one embodiment, job 205 may include a collection of 1-N subroutines 214. As described, each subroutine 214 may be part of a computing task configured to execute concurrently on nodes of a distributed computing system (e.g., the nodes 106 of cluster 100 of FIG. 1). Subroutines 214 may be represented as program source code, executable code, or any other representation used to determine the type of processing activity (or activities) performed by each subroutine 214.

Figure 2C:
FIG. 2C illustrates an example benchmark trait assignment data structure, according to one embodiment of the invention.

FIG. 2C illustrates an example of benchmark trait assignment data structure 215. As shown, benchmark trait assignment data structure 215 provides a table that includes a program activity column 216, a performance trait column 217, and a benchmark 218 column. Each row of this table associates a listed program activity with both a trait (i.e., a computing resource required by that program activity) and a benchmark representative of that program activity.

Entries in program activity column 216 may represent any computing tasks or actions performed by a given subroutine while executing on a node 106. Generally, each program activity listed in column 216 may be dependent on computing resources of a distributed system relative to one or more performance traits, as listed in column 217. For example, the first row of benchmark trait assignment data structure 215 indicates that the efficiency of a "connect" action may be primarily dependent on input-output (I/O) latency. Similarly, the second row indicates that the efficiency of a "read" action may be primarily dependent on available bandwidth to perform the "read" action.

Entries in benchmark column 218 indicate a performance benchmark best-suited to measure the efficiency of a node of a distributed system, relative to the corresponding entry in performance trait column 217. For example, as shown in the first row, to measure the efficiency of I/O latency, the best benchmark is "Benchmark1." The other rows show similar data values for other program actions that may be performed by the subroutines 214 of computing job 205.

By determining which benchmarks most accurately correspond to the program action of subroutines 214, a benchmark profile may be created that may be used to predict the performance of computing job 205 when run a particular distributed system. In one embodiment, the benchmark profile may specify which benchmarks are most representative of job 205, and further may specify different proportions for the benchmarks included in the benchmark profile. Given the example data structure in FIG. 2C, for a program in which 50% of the processing activity is "reads", 25% of the activity is "stores", and 25% of the activity is "connects," a benchmark profile could include benchmark 2, benchmark 3, and benchmark 1, with a contribution for each overall benchmark weighted respectively at 50/25/25. The benchmarks may then be executed on the computing nodes of a distributed system in a variety of different ways to predict the performance of the application represented by the benchmark profile, without having to prepare, load, and execute the actual application. Thus, the preferred nodes for executing each of the subroutines 214 of a job 205 on a distributed cluster (e.g., cluster 100 of FIG. 1) may be determined quickly and efficiently using the benchmark profile and associated benchmarks as a proxy for job 205.

Figure 3:
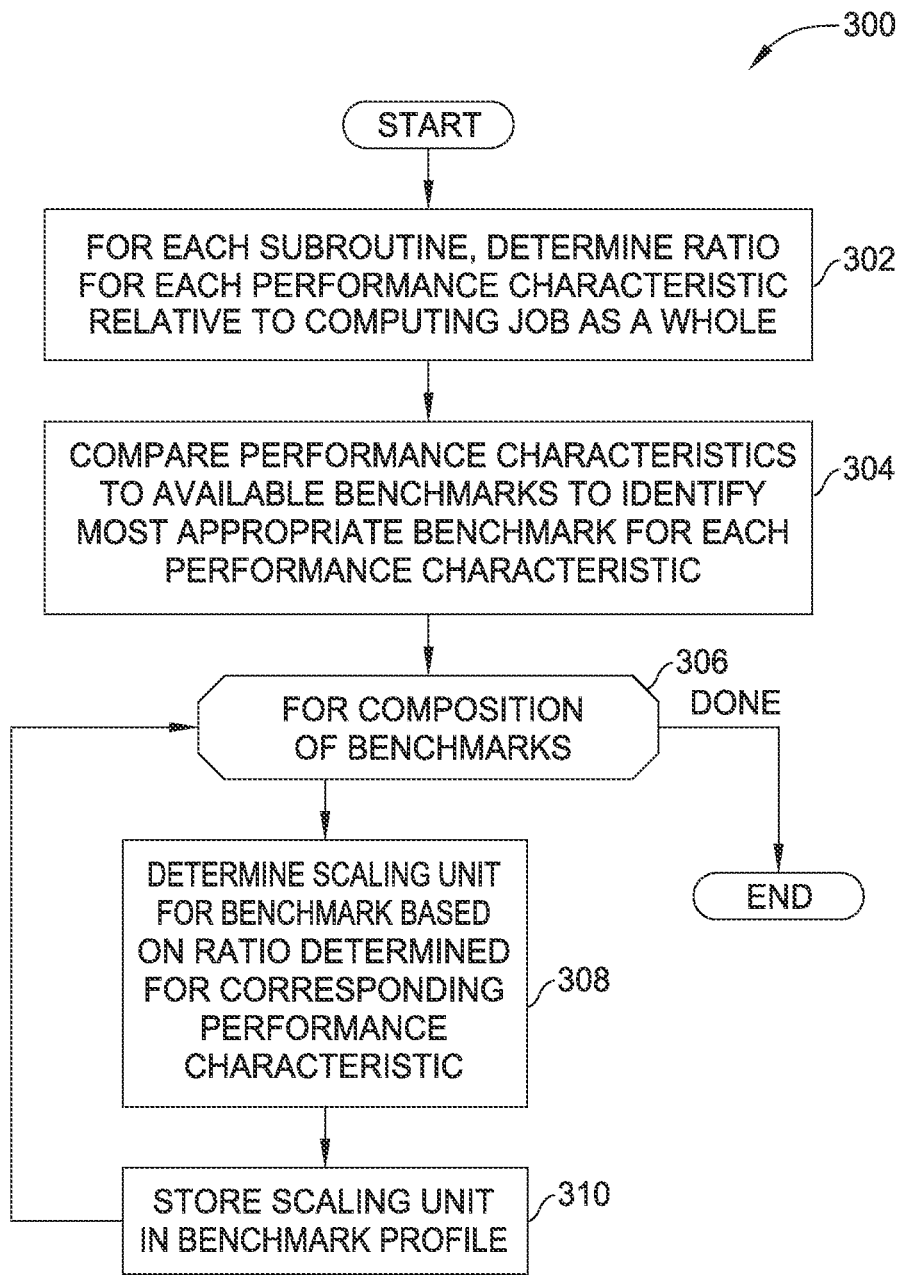
FIG. 3 is a flowchart illustrating a process for creating a benchmark profile for an application configured to run on a distributed system, according to one embodiment of the invention.

FIG. 3 is a flowchart illustrating a method 300 for generating a benchmark profile for an application configured to run on a distributed system, according to one embodiment of the invention. Before a user submits a job for processing on a distributed system, benchmark profiling may aid in determining a preferred distribution of the subroutines 214 of the job 205 on the nodes of a distributed system.

As shown, the method 300 begins at step 302, where the profiling component evaluates the performance characteristics of each subroutine 214 included in a computing job 205. For example, the characteristics of computing job 205 may be categorized with respect to processor utilization, memory utilization, I/O requirements, bandwidth, latency, and others. In one embodiment, the ratio of each of these characteristics, with respect to the job as a whole, is determined for each subroutine 214 and saved within the benchmark profile for computing job 205. The overall performance characteristics of the computing job 205 may be determined from the aggregate performance characteristics of the subroutines.

At step 304, the profiling component may compare the characteristics of computing job determined at step 302 with a collection of available benchmark applications. The benchmarks may be known benchmarks or synthetic benchmarks. For example, known benchmarks such as Linpack, Dhrystone, Whetstone, GliBench. Of course, custom made benchmarks or other known benchmarks may be used. In one embodiment, a benchmark is selected to represent each performance characteristic of the job, or the subroutines of the job, determined at step 302. The composition of benchmarks appropriate for computing job 205 is stored in the benchmark profile.

At step 306, a loop begins that includes steps 308 and 310. For each pass through the loop, the profiling component evaluates the relative performance requirements of the computing job for one of the benchmarks to determine a scaling unit. In one embodiment, this scaling unit matches the ratio of computing activity of each performance characteristic, relative to the activity of the computing job as a whole (i.e., the activities and ratios identified at step 302). Thus, the scaling unit specifies how important the performance of each benchmark identified at step 304 is to the benchmark profile being generated. At step 308, the profiling component 225 determines the scaling unit for one of the benchmarks determined at step 304. At step 310, the profiling component 225 stores the scaling unit in the benchmark profile. Once a scaling unit is determined for each of the benchmarks in the composition of benchmarks, method 300 concludes. Additionally, in one embodiment, a user may manually define the scaling unit for performance traits.

For example, assume that performance characteristics for subroutines 214 of a particular computing job indicate that a program tends to perform I/O actions and memory accesses. Further, as a simplified example, assume that such a computing job includes two subroutines, one that performs six activities for I/O, and another that performs four program for memory access, in such a case, the scaling units for benchmarks used to profile I/O latency and available memory access may be 60% and 40%, respectively. Thus, when generating a benchmark profile for this computing job, method 300 would specify that 60% of benchmark processing time should be committed to a benchmark that evaluates I/O latency, and 40% should be committed to a benchmark that evaluates available memory. Alternatively, the benchmark evaluates that I/O latency may be dispatched to one node of a parallel system, and the benchmark that evaluates memory access may be dispatched to another. In such a case, the performance of the application on these two compute nodes may be predicted using the results of the benchmarks. Further, a composite score of application performance for a computing job may be calculated from 60% of the benchmark score for I/O latency and 40% of the benchmark score for memory access times. Of course, one of skill in the art may utilize the data generated for a computing job using a benchmark profile in a variety of ways.

Figure 4:
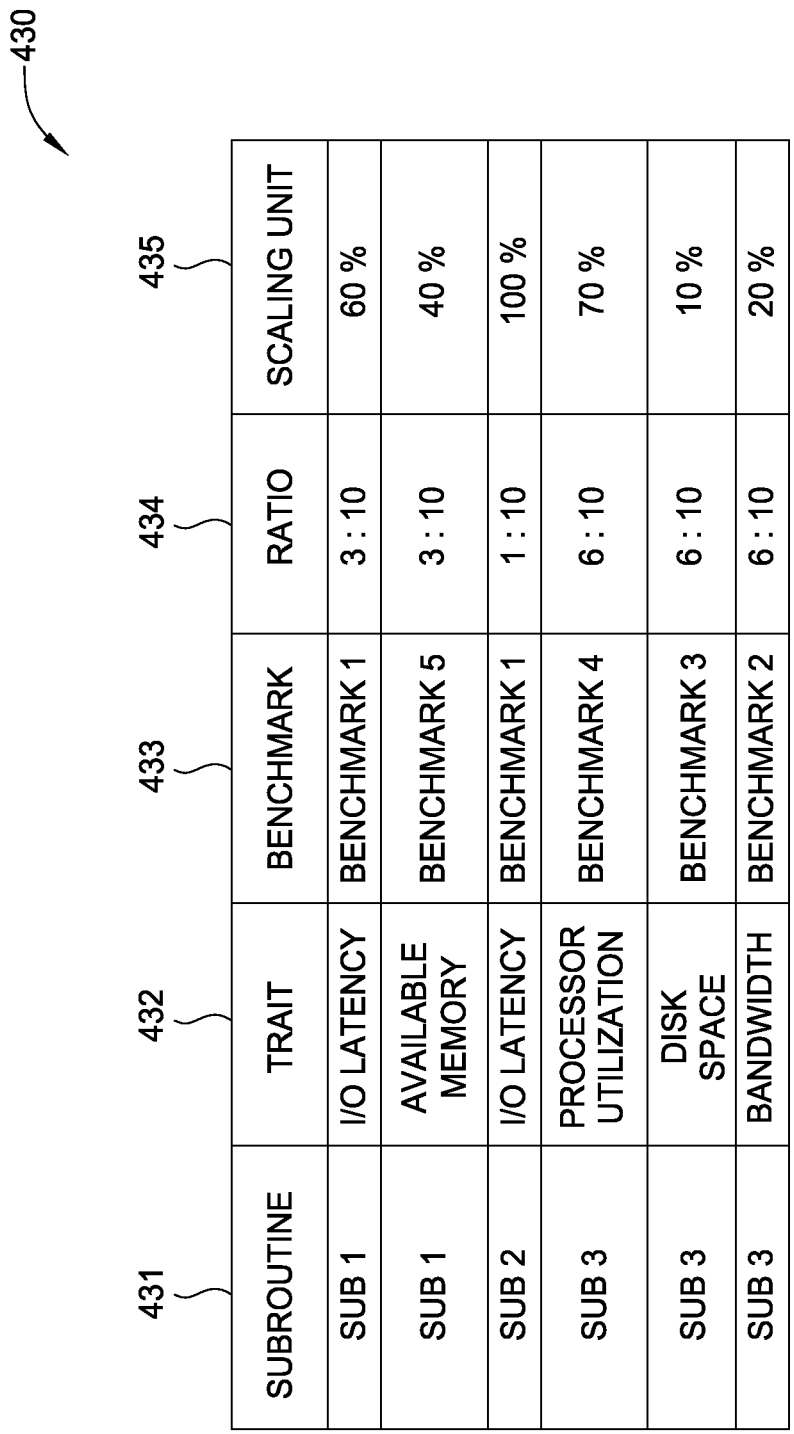
FIG. 4 illustrates an example benchmark profile data structure, according to one embodiment of the invention.

FIG. 4 illustrates an example benchmark profile data structure 430, according to one embodiment of the invention. As shown, benchmark profile data structure 430 is defined as a table that includes a subroutine ID column 431, a performance trait column 432, a benchmark column 433 a ratio column 434, and a scaling unit column 435.

Each entry in benchmark profile data structure 430 identifies, for a subroutine identified in subroutine column 431 and a performance characteristic of that subroutine, a corresponding benchmark, the ratio of programming activity for the subroutine relative to the programming activity for the whole job, and the scaling unit for the performance characteristic relative to the programming activity for the whole subroutine. For example, the first row in table 430 indicates a subroutine ID of "Sub 1," a performance trait for this subroutine of "I/O latency," a benchmark corresponding to "I/O latency" of "Benchmark1," a ratio of "3:10," and a scaling unit of "60." The other entries in benchmark profile data structure 430 provide similar information for other subroutines and performance activity of computing job 205. The scaling ratio may be derived by comparing the number of statements related to a particular performance characteristic, to the total number of statements in the subroutine.

Once a benchmark profile is generated to represent the performance characteristics of a given computing job, the benchmark profile may be used to predict the performance of the application by running the benchmarks specified in the benchmark profile on a given configuration of a distributed system. In one embodiment, the user may invoke the profile execution component to predict or test performance of particular job on a particular system configuration. In turn, the profile execution component accesses the benchmark profile associated with the computing job and executes the benchmarks in the profile across the nodes of a distributed system nodes, with each benchmark running for a time proportional to the scaling unit (i.e. composition ratio) specified in the benchmark profile. The application then measures and saves the results along with the nodes that the benchmarks were run against. The profiles can then be saved, reused, and compared against different versions of the job or against different system configurations.

The benchmark profiles may be based on a combination of source code analysis, initial measured runs, and user input. Further, the predicted performance data may be compared against actual execution data. Still further, the accuracy of a benchmark profile may be improved over time by analysis of the execution performance of the computing job. The actual execution performance the job may then be compared against the benchmark profile to test how well the job matches the benchmarks in the profile. That is, actual execution performance may be used to evaluate the how well the benchmark profile accurately represents the computing activity of the application. If significant differences are found between the actual execution performance and one of more of the benchmarks in the profile, the profile can be updated automatically and/or the user can be notified of the differences.

While the foregoing is directed to embodiments of the present invention, other and further embodiments of the invention may be devised without departing from the basic scope thereof, and the scope thereof is determined by the claims that follow.

What is claimed is:

1. A method of generating a benchmark profile used to predict the performance of a software application including a plurality of subroutines, the method comprising:

identifying a plurality of performance characteristics associated with the software application, wherein each performance characteristic specifies a processing activity performed by the software application, and wherein at least one performance characteristic is associated with more than one of the plurality of subroutines;

for each of the plurality of performance characteristics, determining a ratio specifying a proportion of the processing activity performed by the software application for the performance characteristic relative to the processing activity of the software application as a whole;

for each of the plurality of performance characteristics, identifying at least one synthetic benchmark configured to evaluate the performance of a computer system relative to the performance characteristic;

generating the benchmark profile, wherein the benchmark profile stores the ratio determined for each of the plurality of performance characteristics and an indication of each identified synthetic benchmark;

executing the synthetic benchmarks, each of the synthetic benchmarks identified in the benchmark profile, on a distributed computer system for a period of time corresponding to the ratio determined for each respective performance characteristic of the plurality of performance characteristics; and determining, from the synthetic benchmarks, a composite score based on the performance of the executed synthetic benchmarks, wherein the composite score predicts the performance of the software application on the distributed computer system and is stored in the benchmark profile.

2. The method of claim 1, wherein the ration determined for each of the plurality of performance characteristics is determined for each of the plurality of subroutines.

3. The method of claim 1, wherein the software application is configured to execute on a distributed computer system, and wherein each of the plurality of subroutines is executed on at least one node of the distributed computer system.

4. The method of claim 1, wherein identifying the plurality of performance characteristics associated with the software application comprises evaluating source code of the software application.

5. The method of claim 1, wherein identifying the plurality of performance characteristics associated with the software application comprises dynamically monitoring the software application running on a disturbed computer system.

6. The method of claim 1, wherein a user identifies at least one of the plurality of performance characteristics associated with the software application.

7. The method of claim 1, wherein each of the plurality of performance characteristics characterizes at least on of processor utilization, memory utilization, input/output efficiency, storage device access latency, memory access latency, storage device access latency, and network latency of distributed computer system.

8. A non-transitory computer-readable storage medium containing a program configured to generate a benchmark profile used to predict the performance of a software application including a plurality of subroutines which, when executed on a processor, performs an operation comprising, identifying a plurality of performance characteristics associated with the software application, wherein each performance characteristic specifies a processing activity performed by the software application, and wherein at least one performance characteristic is associated with more than one of the plurality of subroutines;

for each of the plurality of performance characteristics, determining a ratio specifying a proportion of the processing activity performed by the software application for the performance characteristic relative to the processing activity of the software application as a whole;

for each of the plurality of performance characteristics, identifying at least one synthetic benchmark configured to evaluate the performance of a computer system relative to the performance characteristic;

generating the benchmark profile, wherein the benchmark profile stores the ratio determined for each of the plurality of performance characteristics and an indication of each identified synthetic benchmark;

executing the synthetic benchmarks, each of the synthetic benchmarks identified in the benchmark profile, on a distributed computer system for a period of time corresponding to the ratio determined for each respective performance characteristic of the plurality of performance characteristics; and determining, from the synthetic benchmarks, a composite score based on the performance of the executed synthetic benchmarks, wherein the composite score predicts the performance of the software application on the distributed computer system and is stored in the benchmark profile.

9. The computer-readable storage medium of claim 8, wherein the ratio determined for each of the plurality of performance characteristics is determined for each of the plurality of subroutines.

10. The computer-readable storage medium of claim 8, wherein the software application is configured to execute on a distributed computer system, and wherein each of the plurality of subroutines is executed on at least one node of the distributed computer system.

11. The computer-readable storage medium of claim 8, wherein identifying the plurality of performance characteristics is associated with the software application comprises evaluation source code of the software application.

12. The computer-readable storage medium of claim 8, wherein a user identifies at least one of the plurality of performance characteristics associated with the software application.

13. The computer-readable storage medium of claim 8, wherein identifying the plurality of performance characteristics associated with the software application comprises dynamically monitoring the software application running on a distributed computer system.

14. The computer readable storage medium of claim 8, wherein each of the plurality of performance characteristics characterize at least one of processor utilization, memory utilization, input/output efficiency, storage device access latency, memory access latency, storage device access latency, and network latency of a distributed computer system.

15. A system comprising;
a processor; and
a memory containing a program configured to generate a benchmark profile used to predict the performance of a software application, including a plurality of subroutines which, when executed on the processor performs an operation of:

identifying a plurality of performance characteristics associated with the software application, wherein each performance characteristic specifies a processing activity performed by the software application, and wherein at least one performance characteristic is associated with more than one of the plurality of subroutines;

for each of the plurality of performance characteristics, determining a ratio specifying a proportion of the processing activity performed by the software application for the performance characteristic relative to the processing activity of the software application as a whole;

for each of the plurality of performance characteristics, identifying at least one synthetic benchmark configured to evaluate the performance of a computer system relative to the performance characteristic;

generating the benchmark profile, wherein the benchmark profile stores the ratio determined for each of the plurality of performance characteristics and an indication of each identified synthetic benchmark;

executing the synthetic benchmarks, each of the synthetic benchmarks identified in the benchmark profile, on a distributed computer system for a period of time corresponding to the ratio determined for each respective performance characteristic of the plurality of performance characteristics; and determining, from the synthetic benchmarks, a composite score based on the performance of the executed synthetic benchmarks, wherein the composite score predicts the performance of the software application on the distributed computer system and is stored in the benchmark profile.

16. The system of claim 15, wherein the ration determined for each of the plurality of performance characteristics is determined for each of the plurality of sub routines.

17. The system of claim 15, wherein the software application is configured to execute on a distributed computer system, and wherein each of the plurality of subroutines is executed on at least one node of the distributed computer system.

18. The system of claim 15, wherein identifying the plurality of performance characteristics is associated with the software application comprises evaluation source code of the software application.

19. The system of claim 15, wherein identifying the plurality of performance characteristics associated with the software application comprises dynamically monitoring the software application running on a distributed computer system.

20. The system of claim 15, wherein a user identifies at least on of the plurality of performance characteristics associated with the software application.

21. The system of claim 15, wherein each of the plurality of performance characteristics characterize at least one of processor utilization, memory utilization, input/output efficiency, storage device access latency, memory access latency, storage device access latency, and network latency of a distributed computer system.

\* \* \* \* \*